(12) United States Patent
Wang et al.

(10) Patent No.: US 9,516,257 B2
(45) Date of Patent: Dec. 6, 2016

(54) DISPLAY DEVICE HOUSING AND DISPLAY DEVICE

(71) Applicants:BOE TECHNOLOGY GROUP CO., LTD., Beijing (CN); BEIJING BOE VISION-ELECTRONIC TECHNOLOGY CO., LTD., Beijing (CN)

(72) Inventors: Jianting Wang, Beijing (CN); Qin Tan, Beijing (CN); Zhen Zhang, Beijing (CN)

(73) Assignees: BOE TECHNOLOGY GROUP CO., LTD., Beijing (CN); BEIJING BOE VISION-ELECTRONIC TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/429,079

(22) PCT Filed: May 20, 2014

(86) PCT No.: PCT/CN2014/077917
§ 371 (c)(1),
(2) Date: Mar. 18, 2015

(87) PCT Pub. No.: WO2015/100916
PCT Pub. Date: Jul. 9, 2015

(65) Prior Publication Data
US 2016/0044274 A1    Feb. 11, 2016

(30) Foreign Application Priority Data

Dec. 30, 2013  (CN) .......................... 2013 1 0746450

(51) Int. Cl.
*H04R 1/02* (2006.01)
*H04N 5/64* (2006.01)
*H04R 1/28* (2006.01)

(52) U.S. Cl.
CPC ............ *H04N 5/642* (2013.01); *H04R 1/2811* (2013.01); *H04R 1/2819* (2013.01); *H04R 1/2857* (2013.01); *H04R 2499/15* (2013.01)

(58) Field of Classification Search
CPC ........... H04R 1/02; H04R 1/28; H04R 1/2811; H04R 1/2819; H04R 1/2842; H04R 1/2861; H04R 1/30; H04R 1/347; H04R 5/02; H04R 2499/15; H04R 1/2853; H04R 1/2857; H04N 5/642
(Continued)

(56) References Cited

U.S. PATENT DOCUMENTS 5,432,860 A * 7/1995 Kasajima ................. H04R 1/30
                                                   181/152
5,550,921 A   8/1996 Freadman
(Continued)

FOREIGN PATENT DOCUMENTS

CN       1125378 A    6/1996
CN       1279574 A    1/2001
(Continued)

OTHER PUBLICATIONS

International Search Report mailed Sep. 30, 2014; PCT/CN2014/077917.
(Continued)

*Primary Examiner* — Huyen D Le
(74) *Attorney, Agent, or Firm* — Ladas & Parry LLP

(57) ABSTRACT

A display device housing includes a body, the body is provided with a tuning cavity, the tuning cavity is configured for accommodating a loudspeaker of a display device, the (Continued)

tuning cavity is provided with an inverter tube therein, an opening of the inverter tube corresponds to a space at a rear side of the loudspeaker, and another opening of the inverter tube is provided toward a sound-emitting area of an outer wall of the body and communicates with outside of the housing. This display device housing resolves the problems that a display product is easily subjected to bloop, the sound being not loud enough and poor sound effect. Also a display device is provided.

11 Claims, 2 Drawing Sheets

(58) Field of Classification Search
USPC ....... 381/306, 333, 340, 341, 345, 349, 351, 381/386, 388, 337, 338, 382; 379/433.02, 432; 181/152, 155, 156, 199
See application file for complete search history.

(56) References Cited

U.S. PATENT DOCUMENTS

| | | | |
|---|---|---|---|
| 5,710,394 A | 1/1998 | Saito et al. | |
| 5,825,900 A * | 10/1998 | Jeon | H04R 5/02 181/152 |
| 5,920,637 A | 7/1999 | Jeon | |
| 6,389,145 B2 * | 5/2002 | Baumhauer, Jr. | H04R 11/06 379/432 |
| 6,654,472 B1 | 11/2003 | Jeon | |
| 6,658,127 B1 * | 12/2003 | Kim | H04N 5/642 348/E5.13 |

FOREIGN PATENT DOCUMENTS

| | | |
|---|---|---|
| CN | 1774140 A | 5/2006 |
| CN | 2874957 Y | 2/2007 |
| CN | 202121702 U | 1/2012 |
| CN | 202269015 U | 6/2012 |
| CN | 103716723 A | 4/2014 |

OTHER PUBLICATIONS

Written Opinon of the International Searching Authority mailed Sep. 30, 2014; PCT/CN2014/077917.
First Chinese Office Action dated Apr. 12, 2016; Appln. No. 201310746450.0.
Yongren Liao; "Passive Auxiliary Radiation Box and Double Inverter Tube Sound Bax". Sound Principle and Technology, Mar. 31, 1996, p. 99.
Second Chinese Office Action dated Oct. 8, 2016; Appln, No. 201310746450.0.

* cited by examiner

DISPLAY DEVICE HOUSING AND DISPLAY DEVICE

TECHNICAL FIELD

Embodiments of the present disclosure relate to a display device housing and a display device.

BACKGROUND

With the development of economy and technology, the living standard of people is getting increasingly higher, accordingly, panel display products, such as liquid crystal televisions, are used more and more widely.

For example, a liquid crystal television produces sound through a loudspeaker (so-called horn) provided within a liquid crystal television housing, and the loudspeaker is directly fixed in the liquid crystal television housing. Usually, a plurality of meshes or grooves are provided at a region of the liquid crystal television housing, corresponding to the front end (sound-emitting end) of the loudspeaker, in such a way that the sound emitted from the front end of the loudspeaker could directly run through the meshes or the grooves and reach the outside of the housing. The provision of the meshes or grooves can depress the blocking effect of the housing upon the sound, and thus enhance the sound effect of the loudspeaker However, when the sound is directly spread into the outside through the loudspeaker, the sound emitted from the loudspeaker is easy to have bloop and the sound is not loud enough, thus the sound effect of the liquid crystal television is reduced and the user's experience is affected.

SUMMARY

At least one embodiment of the present disclosure provides a display device housing and a display device, used for overcoming the problems of display products, such as being easily subjected to bloop, the sound thereof being not loud enough, and thus having bad sound effect.

At least one embodiment of the present disclosure provides a display device housing comprising a body, the body is provided with a tuning cavity, the tuning cavity is configured for accommodating a loudspeaker of a display device, and the tuning cavity is further provided with an inverter tube therein, an opening of the inverter tube is corresponding to a space at a rear side of the loudspeaker, and another opening of the inverter tube is provided toward a sound-emitting area of an outer wall of the body and communicates with outside of the housing.

For example, a plurality of the inverter tubes is provided, and the plurality of the inverter tubes comprises a plurality of L-type columnar tubes arranged independently from each other, and diameters of the inverter tubes are different from each other. For example, the L-type columnar tubes are cylindrical tubes.

For example, the opening of the inverter tube, arranged corresponding to the space at the rear side of the loudspeaker, is directly opposite to the rear side of the loudspeaker.

For example, the inverter tubes have an identical structure; and for example, the plurality of the inverter tubes is arranged in a same orientation with diameters successively from large to small.

For example, the quantity of the inverter tubes are provided as 3, and the diameters thereof are successively 7 cm, 5.5 cm and 3.5 cm in descending order.

For example, the cavity, the inverter tube and the body are formed integrally, for example, are integrally molded by injection molding.

At least another embodiment of the present disclosure provides a display device comprising the above-mentioned display device housing and a loudspeaker provided within the tuning cavity of the display device housing.

For example, a front end of the loudspeaker is corresponding to a sound-emitting direction of the display device.

At least yet another embodiment of the present disclosure provides a display device housing, comprising a body, a tuning cavity and a plurality of inverter tubes, at least one concave portion of the body defines the tuning cavity, the plurality of inverter tubes is integrally provided within the at least one concave portion of the body, an opening of each of the plurality of inverter tubes is provided in the tuning cavity, and the another opening is arranged toward a sound-emitting area of an outer wall of the body and communicates with the outside of the housing.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

A display device housing of at least one embodiment of the present disclosure will be described in detail in conjunction with the drawings.

Figure 1:
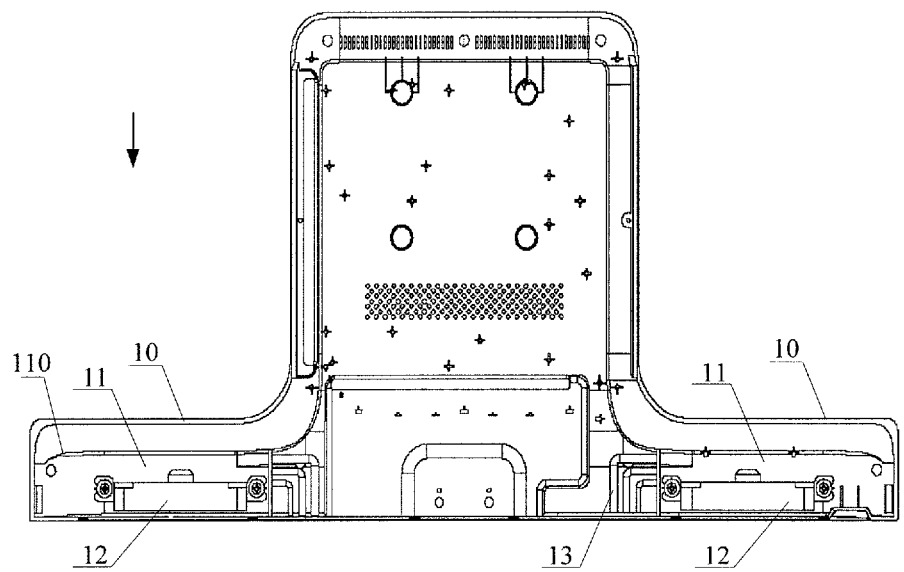
FIG. 1 is a schematic view illustrating a structure of a display device housing provided by an embodiment of present disclosure.

An embodiment of the present disclosure provides a housing of a display device, which, as shown in FIG. 1, comprises a body 10, the body 10 is provided with a tuning cavity 11, the tuning cavity 11 is configured for accommodating a loudspeaker 12 of the display device; the tuning cavity 11 is provided with an inverter tube 13 therein, and an opening of the inverter tube 13 corresponds to the space at a rear side of the loudspeaker 12, and the other opening of the inverter tube 13 is provided toward a sound-emitting area (namely a side toward which the head of the arrow in FIG. 1 is provided) of an outer wall of the body 10 and communicates with the outside of the housing. That is to say, an opening of the inverter tube 13 is provided inside the tuning cavity 11, and the other opening is provided toward the sound-emitting area of the outer wall of the body 10.

In at least one embodiment of the present disclosure, as shown in FIG. 1, at least one concave portion 110 of the body 10 defines the tuning cavity 11, a plurality of inverter tubes 13 are integrally provided within the at least one concave portion 110 of the body 10, and an opening of each of the plurality of inverter tubes 13 is provided inside a tuning cavity 11, and the other opening is arranged toward the sound-emitting area of the outer wall of the body 10 and communicates with the outside of the housing.

The display device housing provided by embodiments of the present disclosure comprises a body provided with a tuning cavity, a loudspeaker can be provided inside the tuning cavity, and the front end of the loudspeaker corresponds to the sound-emitting area of the outer wall of the body. The tuning cavity is also provided with an inverter tube, and the inverter tube has inverting function, i.e., to reverse the phase of the acoustic wave passing through the inverter tube. An opening of the inverter tube is corresponding to the space at the rear side of the loudspeaker, and the other opening is provided toward the sound-emitting area of the outer wall of the body and communicates with the outside. It can be seen that the tuning cavity forms a sound cavity, the acoustic wave emitted from the front end of the loudspeaker passes through the tuning cavity and then transmits out from the sound-emitting area of the outer wall of the body, and this can effectively reduce the bloop; and at the same time, the acoustic wave at the rear side of the loudspeaker is subjected to phase inversion through the inverter tube and then transmits into the outside in the same orientation from the sound-emitting area of the outer wall of the body, thereby the acoustic wave from the rear side of the loudspeaker, after the phase inversion, overlays with the acoustic wave from the front end of the loudspeaker, and this can enhance the sound pressure, enlarge the sound bandwidth, and depress the distortion effect of sound and thus improve the sound effect.

It is to be noted herein that, in some embodiments of the present disclosure, according to the setting of the loudspeaker, a front sound cavity and a rear sound cavity can be formed inside the housing, and through the setting, the sound emitted from the front end of the loudspeaker is wholly transmitted outside through the front sound cavity, here a spacer plate may be provided according to the dimensions of the front end of the loudspeaker. The front sound cavity is composed of a housing portion provided at the sound-emitting side (the front side) of the loudspeaker and other structures comprising side walls, so as to emit sound toward the front side. The rear sound cavity is composed of a housing portion provided at the rear side of the loudspeaker and other structures comprising side walls, and can form a cavity resonant cavity, that is, the acoustic wave emitted backward from the loudspeaker can be enhanced in the rear sound cavity, and at the same time, can be transmitted in the same orientation as that emitted from the front end of the loudspeaker, after the inverting function of the inverter tube, thereby the acoustic waves from the front end and the rear side of the loudspeaker can be overlaid, and the sound effect can be effectively improve. For example, the loudspeaker can be fixed within the cavity through a support, here the support does not affect the normal propagation of the sound at least, and the cavity may also be fixedly connected with the loudspeaker by designing the structure of the cavity. For example, the loudspeaker is provided in the tuning cavity, and the space of the tuning cavity is spaced apart from the space of other components provided in the housing.

The body 10 in FIG. 1 is the rear housing of the display device, however, the embodiments of present disclosure is not limited thereto.

Figure 2:
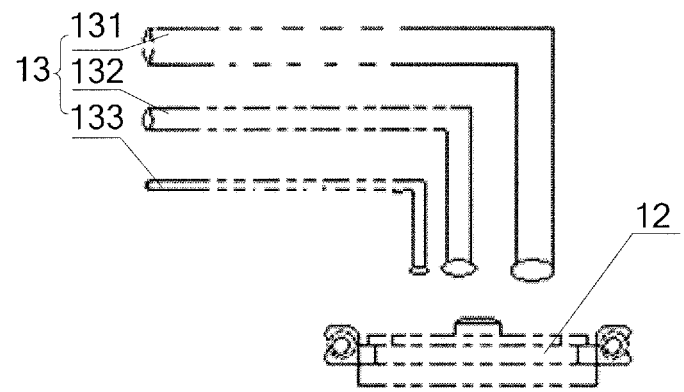
FIG. 2 is a schematic view showing a positional relationship between a loudspeaker and inverter tubes provided by an embodiment of the present disclosure.

For example, in at least one embodiment of the present disclosure, there may be a plurality of inverter tubes 13, as illustrated in FIGS. 1 and 2, three inverter tubes 13 arranged independently from each other may be provided, and the structures of the inverter tubes 13 may be identical and employ the L-type structure shown in FIGS. 1 and 2. Such an L-type structure can effectively perform a phase inversion of 180° upon the acoustic wave emitted backward from the loudspeaker 12 so as to lead the acoustic wave to overlay with the acoustic wave from the front end of the loudspeaker 12, and this is convenient and prompt. For example, the structures of the three inverter tubes 13 may be cylindrical, and of course, the sections thereof may also be in other shapes, for example, rectangle, hexagon and the like. In order to meet the user's requirements for the treble, midrange, bass frequencies, the diameters of the three inverter tubes 13 may be provided to be different from each other correspondingly.

In FIG. 2, the inverter tubes 13 each are provided with an opening corresponding to the space at the rear side of the loudspeaker 12, and the opening is arranged directly opposite to the rear side of the loudspeaker 12, that is, this opening just faces toward the rear side of the loudspeaker 12, so that the acoustic wave from the rear side of the loudspeaker 12 can run through each inverter tube 13 quickly, to complete the inverting function. The positional relationship between the inverter tube 13 and the loudspeaker 12 illustrated in FIG. 2 is an illustrative manner. It's merely required for an opening of the inverter tube 13 to be provided corresponding to the space at the rear side of the loudspeaker 12, so that the reflected acoustic wave arrives into the inverter tube 13 to be carried out the phase inversion operation.

In addition, the sound-emitting area at the outer wall of the body 10 needs to be designed according to the structure of the display device.

It is to be noted that, FIG. 2 is merely an explanatory view illustrating the relative position of the loudspeaker 12 to three inverter tubes 13. The three inverter tubes 13 comprise the first inverter tube 131, the second inverter tube 132 and the third inverter tube 133. Here, the first inverter tube 131 has the maximal diameter, and the third inverter tube 133 has the minimal diameter.

For example, the three inverter tubes 13 may be arranged in the same orientation in descending order with respect to their diameters, and thus the low, intermediate, high frequencies are controlled by controlling the parameters of the three inverter tubes 13. For example, in an embodiment, the inverter tube having the maximal diameter may have a diameter of 7 cm, and the length of the inverter tube is provided to be 25 cm, the audio frequency corresponding thereto is 20~200 Hz, in such a way that when this inverter tube is used in the low frequency mode, the low frequency may provide a feeling of sufficient quantity; and secondly, the inverter tube of secondary diameter may have a diameter of 5.5 cm, and its corresponding length is provided to be 15 cm, so that the audio frequency corresponding thereto is 200~6000 Hz, that is, corresponds to the intermediate frequency, in such a way that the sound at the intermediate frequency emitted from the loudspeaker provides a feeling of being thick and full; and eventually, the inverter tube having the minimal diameter may have a diameter of 3.5 cm, and the corresponding length is provided to be 10 cm, so that the corresponding audio frequency thereof is 6000~15000 Hz, that is, corresponds to the high frequency, in such a way that the sound at the high frequency emitted from the loudspeaker provides an extending effect. For example, the thicknesses of the inverter tubes, each, are 1.2 mm or above, for example, may be 2.6 mm. Therefore, by these three individual inverter tubes, it's possible to implement the control over the low, intermediate, high frequencies, thus it's possible to create all-band sound effects of distinct tonal quality according to user's demands, and then for the currently widely-used liquid crystal televisions of a thin type, the technical problems, such as dry and astringent voice, bad bass effect, can be avoided.

In FIG. 2, the first inverter tube 131 has the maximal diameter, the third inverter tube 133 has the minimal diameter, and both are arranged in a direction perpendicular to a plane.

It is to be noted that, the dimensions of the above-mentioned cavity 11 can be regulated according to different display products and the structural arrangements of their bodies (comprising the product dimensions and the space of the bodies), so that a better sound effect can be reached through a plurality of experiments.

In at least one embodiment of the present disclosure, the cavity 11, the inverter tube 13 are provided to be integrally molded with the body 10 by injection molding. Generally, the housing for a display product usually employs plastic, therefore, such an integration design can be implemented not only easily, but also at lower cost, and increase the cost performance for the display product greatly. Moreover, this design comprises a plurality of individual inverter tubes which can be used to implement the control of separating the low, intermediate, high frequencies, so as to create all-band sound effects of distinct tonal qualities according to the hearer's demands.

At least one embodiment of the present disclosure also provides a display device comprising a display device housing described by any one of the above-mentioned embodiments, and a loudspeaker provided within the tuning cavity of the display device housing. The embodiment of the present disclosure has no specific restriction on the detail construction, type of the loudspeaker.

Figure 3:
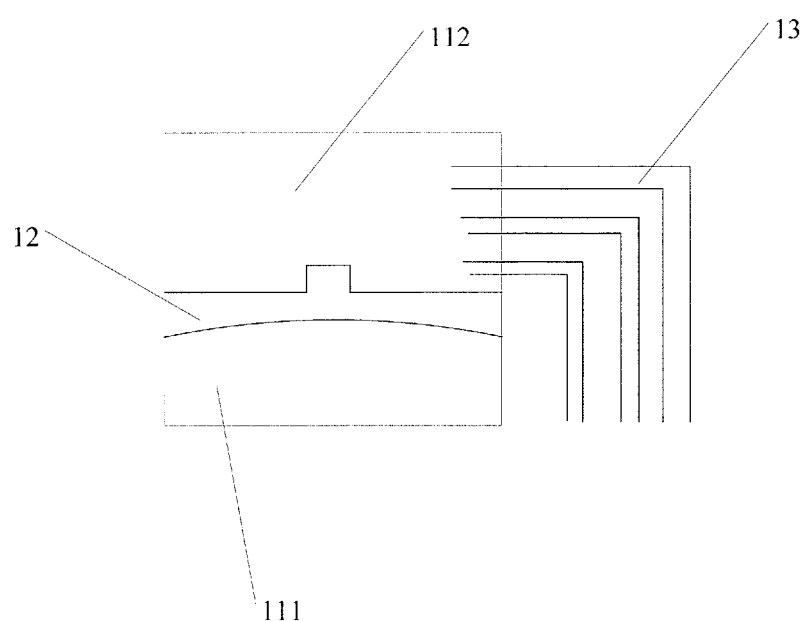
FIG. 3 is a schematic view illustrating a structure of a loudspeaker provided by an embodiment of present disclosure.

As shown in FIG. 3, in an embodiment of the present disclosure, according to the arrangement of the loudspeaker 12, the housing may be provided with a front sound cavity 111 and a rear sound cavity 112 therein, and an end of the inverter tube 13 is provided within the rear sound cavity 112.

In the display device provided by at least one embodiment of the present disclosure, the display device housing described by above-mentioned embodiments is employed, so the housing of this display device comprises a body provided with a tuning cavity, and a loudspeaker is provided within the tuning cavity. The front end of the loudspeaker is provided to be corresponding to the sound-emitting area of the outer wall of the body, the tuning cavity is also provided with an inverter tube therein, an opening of the inverter tube is corresponding to the space at the rear side of the loudspeaker, and the other opening of the inverter tube is provided toward the sound-emitting area of the outer wall of the body and communicates with the outside. It can be seen that, the tuning cavity forms a sound cavity, the acoustic wave emitted from the front end of the loudspeaker passes through the tuning cavity and then transmits out from the sound-emitting area of the outer wall of the body, and this can reduce the bloop effectively; and at the same time, the acoustic wave at the rear side of the loudspeaker is subjected to phase inversion through the inverter tube and then transmits into the outside in the same orientation from the sound-emitting area of the outer wall of the body, thereby the acoustic wave from the rear side of the loudspeaker, after the phase inversion, overlays with the acoustic wave from the front end of the loudspeaker, and this can enhance the sound pressure, enlarge the sound bandwidth, and depress the distortion effect of sound and thereby improve the sound effect.

In the display device, for example a liquid crystal television, the front end of its loudspeaker is corresponding to the sound-emitting direction of the display device, and this sound-emitting direction is generally the direction opposite to a user when the user watches the liquid crystal television, so as to facilitate the user experience.

In the description of the present disclosure, it's to be understood that the orientation or positional relationship. indicated by the terms "center", "upper", "lower", "front", "rear", "left", "right", "vertical", "horizontal", "top", "bottom", "internal", "external" and the like means the orientation or positional relationship illustrated based on the drawings, and is only used for the convenience of describing the present disclosure and simplifying the description, rather than teaches or suggests that the indicated device or element have to take the special orientation, be designed and operated in the special orientation, and hence can not be understood as a limitation to the present disclosure.

The terms "first", "second" are used only for the purpose of description, rather than being understood as indicating or suggesting a relative importance or implicitly teaching the number of the indicated technical features. Hence, the features defined by the "first", "second" may clearly indicate or impliedly comprise one or more of the features. Unless stated otherwise, the term "a plurality of" means two or more in the description of the present disclosure.

It is to be noted that, in the description of the present disclosure, unless explicitly regulated and restricted otherwise, the terms "install", "connect", "couple" should be understood in a broad sense, for example, may be a permanent connection, may also be a detachable connection, or an integral connection; may be coupled directly, may also be indirectly coupled through intermediate parts, may be the internal communication between two elements. The skilled person in this art can appreciate the specific meaning in the present disclosure of the above terms according to specific circumstances.

In the description of the present specification, the specific features, structures, materials or behaviors may be combined in suitable manners in optional one or more embodiment(s) or example(s).

What are described above is merely some embodiments of the present disclosure, however, the protective scope of the present disclosure is not limited thereto, and any skilled being familiar with this art could readily conceive alterations or alternations within the technical scope disclosed by the present disclosure, which belong to the protective scope of the present disclosure. Therefore, the protective scope of the present disclosure should accord with the protective scope defined by the claims.

The present application claims the priority of the Chinese Patent Application No.201310746450.0, filed on Dec. 30, 2013, which is hereby incorporated by reference.

What is claimed is:

1. A display device housing, comprising a body, wherein the body is provided with a tuning cavity, the tuning cavity is configured for accommodating a loudspeaker of a display device, the tuning cavity is provided with an inverter tube therein, and an opening of the inverter tube corresponds to a space at a rear side of the loudspeaker, and another opening of the inverter tube is provided toward a sound-emitting area of an outer wall of the body and communicates with outside of the housing; and wherein a plurality of the inverter tubes is provided, and the plurality of the inverter tubes comprises a plurality of L-type columnar tubes arranged independently from each other, the L-type columnar tubes are cylinder tubes, and diameters of the inverter tubes are different from each other, and the plurality of the inverter tubes is arranged in a same direction with the diameters successively from large to small.

2. The display device housing according to claim 1, wherein the opening of each inverter tube, corresponding to the space at the rear side of the loudspeaker, is directly opposite to the rear side of the loudspeaker.

3. The display device housing according to claim 2, wherein the tuning cavity, the inverter tube and the body are formed integrally.

4. The display device housing according to claim 1, wherein the quantity of the inverter tubes are provided as 3, and the diameters are successively 7 cm, 5.5 cm and 3.5 cm from large to small.

5. The display device housing according to claim 4, wherein the tuning cavity, the inverter tube and the body are formed integrally.

6. The display device housing according to claim 1, wherein the tuning cavity, the inverter tube and the body are formed integrally.

7. A display device, comprising a display device housing according to claim 1, and a loudspeaker provided within the tuning cavity of the display device housing.

8. The display device according to claim 7, wherein a front end of the loudspeaker corresponds to a sound-emitting direction of the display device.

9. The display device according to claim 8, wherein the loudspeaker is fixed into the tuning cavity with a support.

10. The display device according to claim 8, wherein the loudspeaker is fixed into the tuning cavity with a support.

11. A display device housing, comprising a body, a tuning cavity and a plurality of inverter tubes, wherein at least one concave portion of the body defines the tuning cavity, the plurality of inverter tubes is integrally provided within the at least one concave portion of the body; and an opening of each of the plurality of the inverter tubes is provided in the tuning cavity, and another opening is arranged toward a sound-emitting area of an outer wall of the body and communicates with outside of the housing, the plurality of the inverter tubes has different sizes, and the plurality of the inverter tubes are arranged in a same direction with the sizes successively from large to small.

* * * * *